(No Model.)
L. S. GARDNER.
UNIVERSAL JOINT.
No. 595,538.  Patented Dec. 14, 1897.
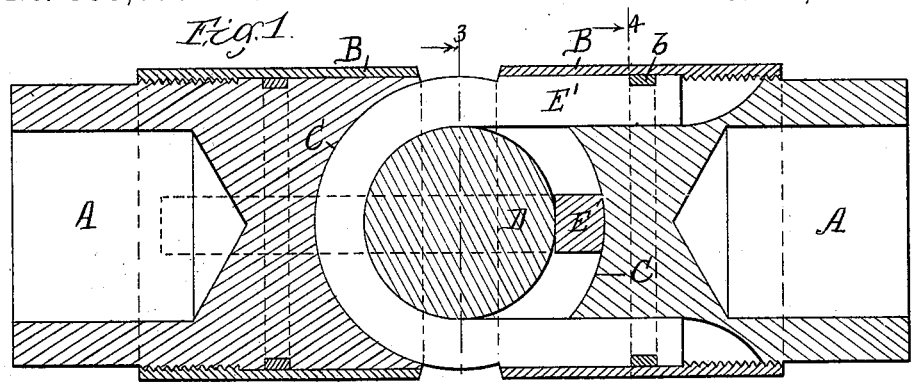
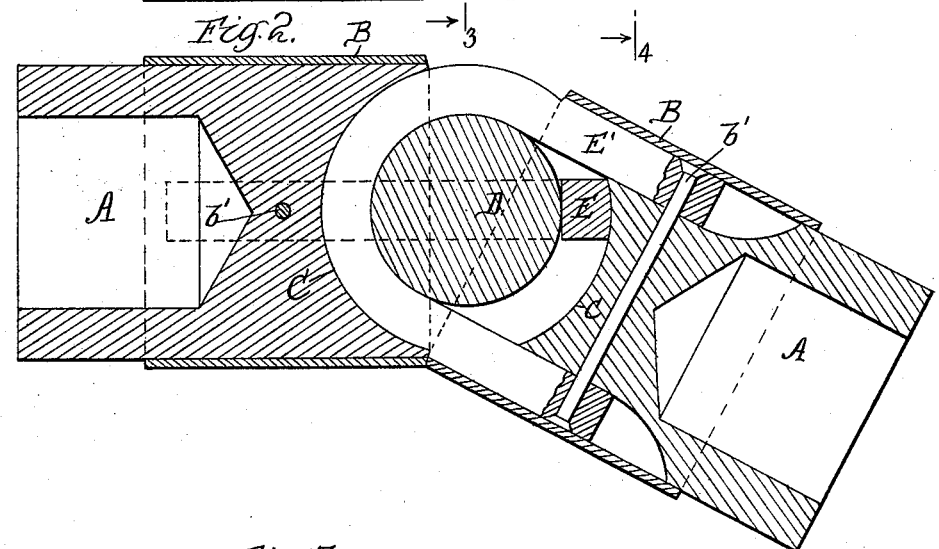
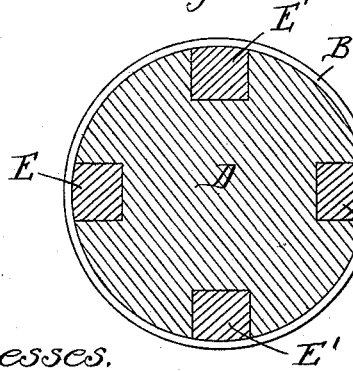
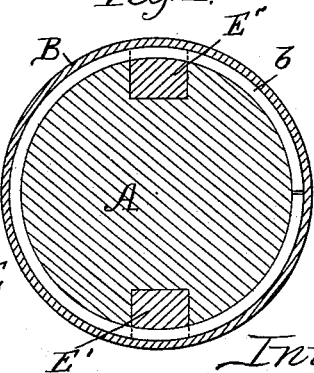
Witnesses.
Wm. M. Rheem
Josh H. Chamberlin
Inventor
Levi S. Gardner
by Walter H. Chamberlin
Atty.

UNITED STATES PATENT OFFICE.

LEVI S. GARDNER, OF NEW ORLEANS, LOUISIANA, ASSIGNOR TO THE GARDNER MOTOR COMPANY, LIMITED, OF SAME PLACE.

UNIVERSAL JOINT.

SPECIFICATION forming part of Letters Patent No. 595,538, dated December 14, 1897.

Application filed July 21, 1896. Serial No. 599,986. (No model.)

*To all whom it may concern:*

Be it known that I, LEVI S. GARDNER, a citizen of the United States, residing at New Orleans, parish of Orleans, State of Louisiana, have invented a certain new and useful Improvement in Universal Joints; and I declare the following to be a full, clear, and exact description of the invention, such as will enable others skilled in the art to which it pertains to make and use the same, reference being had to the accompanying drawings, which form a part of this specification.

My invention has for its object the production of a universal joint for use in any machine where such devices are applicable which shall be simple and strong in construction, easy of operation, and durable.

It consists in a combination of devices hereinafter described and claimed.

In the drawings, Figure 1 is a longitudinal section. Fig. 2 is a longitudinal section of variation. Fig. 3 is a sectional view on the line 3 3 of Fig. 1. Fig. 4 is a sectional view on the line 4 4 of Fig. 1.

In carrying out the invention, A represents any suitable sockets adapted to receive the ends of the shafts to be connected by the joint. These may of course be any suitable size or shape as desired. On each socket is a sleeve B. The end of each socket is concave, as shown at C, Fig. 2.

D is a ball the convex surface of which fits the concave surface in the end of each socket A.

E' are what I will term "straps." They are U-shaped pieces square in cross-section, as shown in Fig. 3, and engaged to the sockets in any suitable way. In Fig. 1 I have shown them keyed to the socket by the ring $b$, while in Fig. 2 I have shown them keyed to the socket by the pin $b'$. The closed ends of these straps rest in circumferential grooves in the face of the ball D. The strap E is in a plane at right angles to the plane of the strap E', as shown in Figs. 2 and 3.

It will be seen by the above description that the joint is universal—that is to say, when the two shafts are thrown to an angle with each other and one is revolved the other will also be revolved, each shaft being held to the ball by its particular strap, and consequently the ball acting as a connecting-link between the two shafts to take up both the tensile and thrusting strains between the shafts, and also acting to maintain the straps in their relative positions at right angles to each other, so that the revolution of one shaft will be communicated to the other shaft.

It is obvious that numerous details of my above-described construction might be altered or dispensed with without departing from the spirit of the invention. For instance, the sleeve B might be dispensed with, the ends $c$ of the socket and sleeve might be shortened, so that the shafts, instead of being limited to an angle of thirty degrees with each other, might be thrown to an angle of sixty degrees, more or less, with each other, and the shape of the straps in cross-section might be varied and numerous other details be changed.

By my construction as above set forth I am enabled to greatly reduce the size of the parts, and consequently the size of the joint, for a given capacity of transmission. Owing also to the compactness of the joint and the ability of the ball to transmit end thrusts as well as the rotary motion the joints can be used in many machines where other joints would be impracticable—such, for instance, as propeller-shafts, multiple drills, and even in an ordinary line of shafting. Again, my construction is of material advantage, since the parts even when worn can be readily replaced by new ones without replacing the entire joint. Again, in the use of my joint it is the straps which wear and not the ball itself. Consequently, even though the straps are worn somewhat, the ball maintains the two shafts in proper alinement or relation to each other, owing to the concave ends of the shaft fitting the convex surface of the ball, and by reason of the shafts being thus held in proper relations to each other the parts do not become heated and the joints twisted off. Again and perhaps the most important advantage is that it is substantially dust and chip proof, its life and efficiency being thereby greatly lengthened and increased.

What I claim is—

1. A universal joint consisting of the combination with the two adjacent ends of the shaft each of said ends having a concave surface, of a ball between said concave shaft ends, each shaft held to the ball by a U-shaped strap passing around the ball and detachably engaged to the end of the shaft, each strap being in a plane at right angles to the other, substantially as described.

2. A universal joint consisting of the combination with the two adjacent ends of the shafts each of said ends having a concave surface, a ball between said shaft ends and fitting the concave surface of each, each shaft held to the ball by a U-shaped strap passing around the ball and countersunk therein, the open end of said U-shaped strap being engaged to the shaft and each strap being in a plane at right angles to the other substantially as described.

In testimony whereof I sign this specification in the presence of two witnesses.

LEVI S. GARDNER.

Witnesses:
DE WITT W. CHAMBERLIN,
W. H. CHAMBERLIN.